(12) United States Patent
Prendergast et al.

(10) Patent No.: US 12,402,577 B2
(45) Date of Patent: Sep. 2, 2025

(54) POWER CONTROL SYSTEM

(71) Applicant: Komatsu America Corp., Chicago, IL (US)

(72) Inventors: Tevin Prendergast, Chattanooga, TN (US); Kendrick Gibson, Chattanooga, TN (US); Greg Turner, Chattanooga, TN (US)

(73) Assignee: Komatsu America Corp., Chicago, IL (US)

( * ) Notice: Subject to any disclaimer, the term of this patent is extended or adjusted under 35 U.S.C. 154(b) by 474 days.

(21) Appl. No.: 17/591,671

(22) Filed: Feb. 3, 2022

(65) Prior Publication Data

US 2022/0312694 A1 Oct. 6, 2022

Related U.S. Application Data

(60) Provisional application No. 63/169,133, filed on Mar. 31, 2021.

(51) Int. Cl.
  *G05D 1/00* (2024.01)
  *A01G 23/093* (2006.01)
  *F15B 21/08* (2006.01)

(52) U.S. Cl.
  CPC .......... *A01G 23/093* (2013.01); *F15B 21/08* (2013.01)

(58) Field of Classification Search
  CPC .................................................. A01G 23/093
  See application file for complete search history.

(56) References Cited

U.S. PATENT DOCUMENTS

| 5,575,148 A | 11/1996 | Hirata et al. |
| 5,704,429 A * | 1/1998 | Lee ........................ E02F 9/2004 |
| | | 701/50 |
| 6,282,892 B1 | 9/2001 | Arai |

(Continued)

FOREIGN PATENT DOCUMENTS

| FI | 125919 B | 4/2016 |
| WO | 03096794 A1 | 11/2003 |

OTHER PUBLICATIONS

Komatsu *Harvesting Head*; Komatsu Forest AB; dated Dec. 14, 2015; 2 pages; USA.

(Continued)

*Primary Examiner* — Vivek D Koppikar
*Assistant Examiner* — Paul W Arellano
(74) *Attorney, Agent, or Firm* — Husch Blackwell LLP

(57) ABSTRACT

A power control system for a forestry machine may include an engine control module and a pump control module. The engine control module may be configured to control an engine speed of an engine of the forestry machine. The engine speed may be limited in accordance with a maximum engine speed. The pump control module may determine whether a first function of the forestry machine is activated, determine whether a sensed pressure of a pump associated with the first function is greater than or equal to a high pressure setpoint, and output a control signal indicating a request for a power increase in response to determining that the first function is activated and the sensed pressure is greater than or equal to the high pressure setpoint. The engine control module may increase the maximum engine speed in response to the request for the power increase from the pump control module.

18 Claims, 5 Drawing Sheets

(56) References Cited

U.S. PATENT DOCUMENTS

| | | | |
|---|---|---|---|
| 6,389,808 B1* | 5/2002 | Sakai | E02F 9/2246 |
| | | | 60/329 |
| 7,661,499 B2 | 2/2010 | Matsuyama | |
| 8,010,260 B2 | 8/2011 | Toda | |
| 9,435,105 B2 | 9/2016 | Fleischmann et al. | |
| 2009/0223214 A1 | 9/2009 | Drake et al. | |
| 2009/0229261 A1 | 9/2009 | Lin et al. | |
| 2010/0014334 A1* | 1/2010 | Katou | H02M 7/2176 |
| | | | 363/126 |
| 2010/0050601 A1* | 3/2010 | Nakamura | F01N 3/208 |
| | | | 60/277 |
| 2016/0184846 A1* | 6/2016 | Pellin | B05B 7/1693 |
| | | | 219/386 |
| 2018/0223764 A1* | 8/2018 | Marrack | F02D 41/3082 |
| 2019/0360175 A1* | 11/2019 | Myers | E02F 9/26 |
| 2021/0079819 A1* | 3/2021 | Lee | F01M 1/16 |

OTHER PUBLICATIONS

Komatsu *Feller Buncher*; Komatsu Forest AB; dated Feb. 2020; 24 pages; USA.
Office Action regarding Canadian Patent Application No. 3151717, dated May 9, 2023.
Office Action regarding Finnish Patent Application No. 20225277, dated Oct. 28, 2022.
Canadian Office Action regarding Patent Application No. 3151717, dated Jun. 3, 2024.

* cited by examiner

POWER CONTROL SYSTEM

CROSS-REFERENCE TO RELATED APPLICATIONS

This application claims the benefit of U.S. Provisional Application No. 63/169,133, filed on Mar. 31, 2021. The entire disclosure of the above application is incorporated herein by reference.

FIELD

The present disclosure relates to power control systems for forestry machines.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Forestry machines are configured to perform multiple functions related to topping, delimbing, cutting, and processing trees, removing tree stumps, etc. A forestry machine may include multiple attachments for performing respective functions. For example, a harvester may include multiple saws and attachments for performing delimbing, topping, and feed functions. A feller buncher is configured to grasp, cut, and move multiple trees at a time. A forestry excavator may be configured to perform harvester, processor, and loader functions, stump removal, etc.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some functions performed by forestry machines require large amounts of power. Excavation functions, cutting functions, feed functions, etc. may encounter resistance during some tasks. Accordingly, these tasks may require even greater amounts of power to complete. However, power is typically limited by the capabilities of a hydraulic system of the machine (e.g., pressure limits of the hydraulic system), which are in turn limited by engine speed and horsepower.

Some machines may be configured to provide a temporary increase in engine speed and horsepower and a maximum pressure of the hydraulic system (i.e., a hydraulic pressure) to correspondingly increase power available to complete a task. For example, the machine may include a button, switch, or lever that is activated to increase engine speed (and, correspondingly, a pump/hydraulic flow rate) and maximum pressure. In some examples, an operator of the machine must hold down a button to increase the engine speed and/or remove their hand from a control stick to activate a switch or lever. Accordingly, activating a power increase may complicate and interfere with efficient operation of the machine using the control sticks.

Power control systems and methods for forestry machines according to the present disclosure are configured to automatically activate a power increase without requiring the operator to activate a separate button or switch. For example, the power increase may be activated in response to one or more selected functions (i.e., one of a subset of all possible functions performed by the machine, which may be referred to herein as "high pressure functions") being activated and a pressure (e.g., a pressure of a pump associated with the task being performed) reaching a predetermined setpoint or threshold.

Figure 1A:
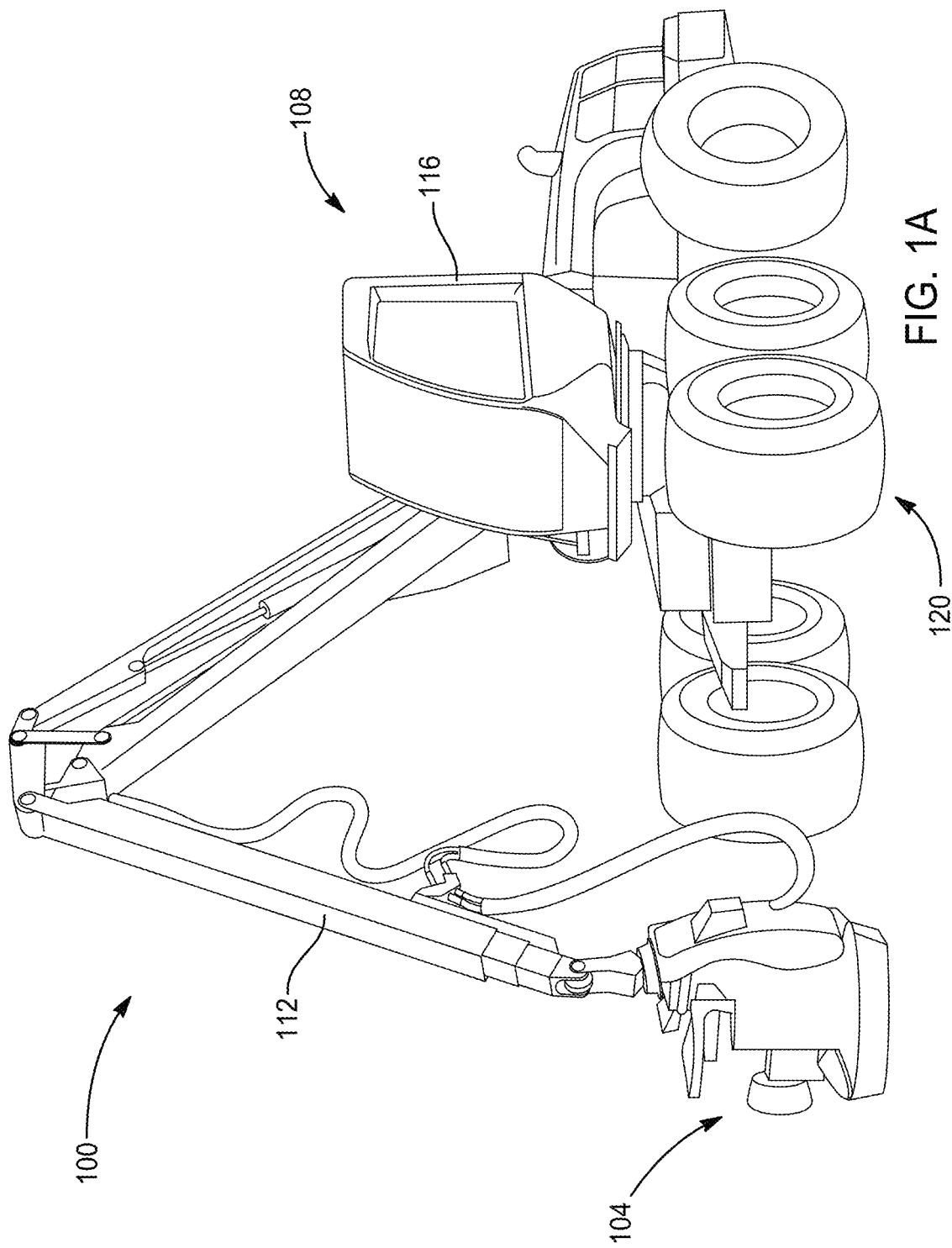
FIG. 1A is an example forestry machine according to the present disclosure.
Figure 1B:
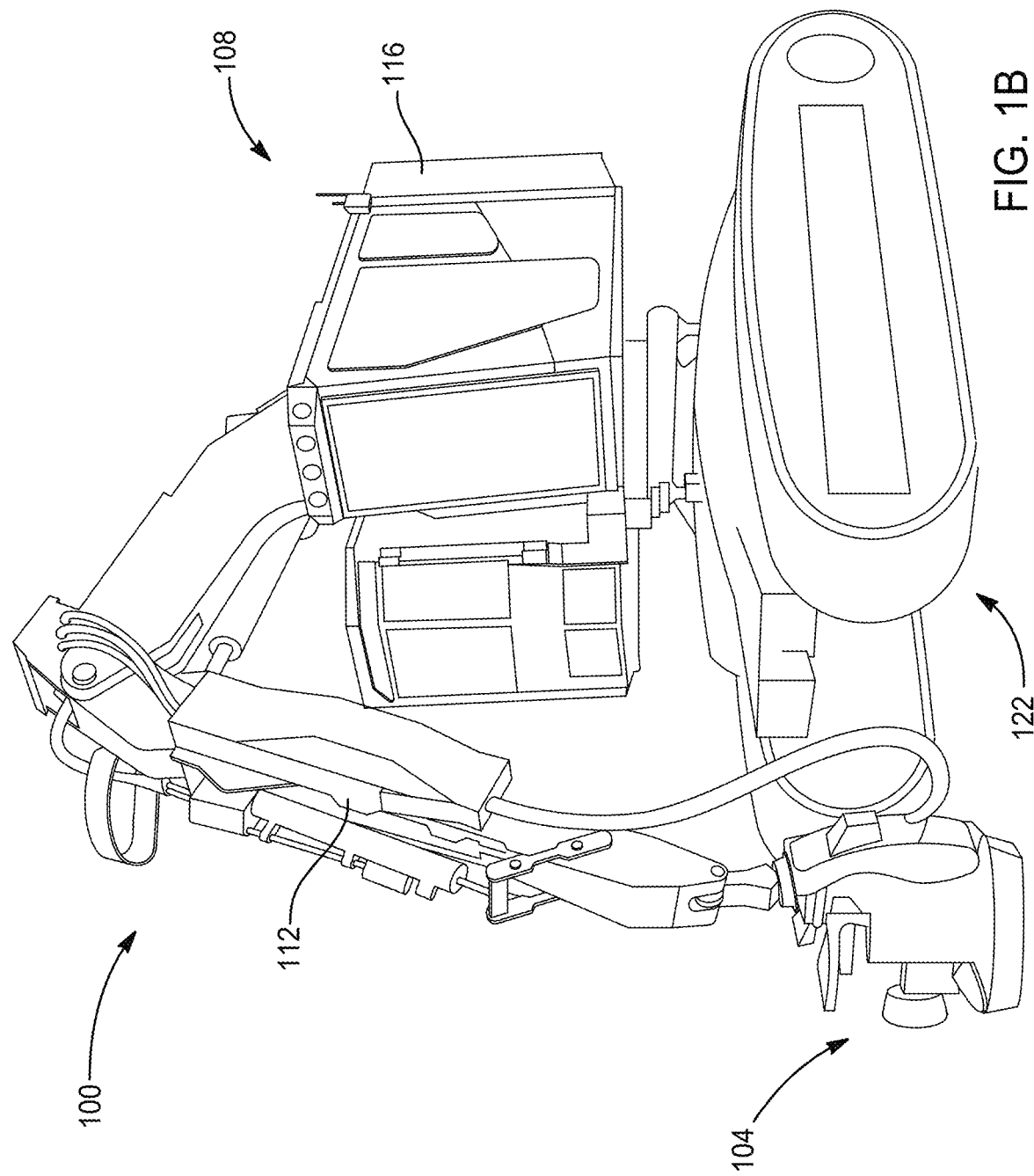
FIG. 1B is another example forestry machine according to the present disclosure.
Figure 1D:
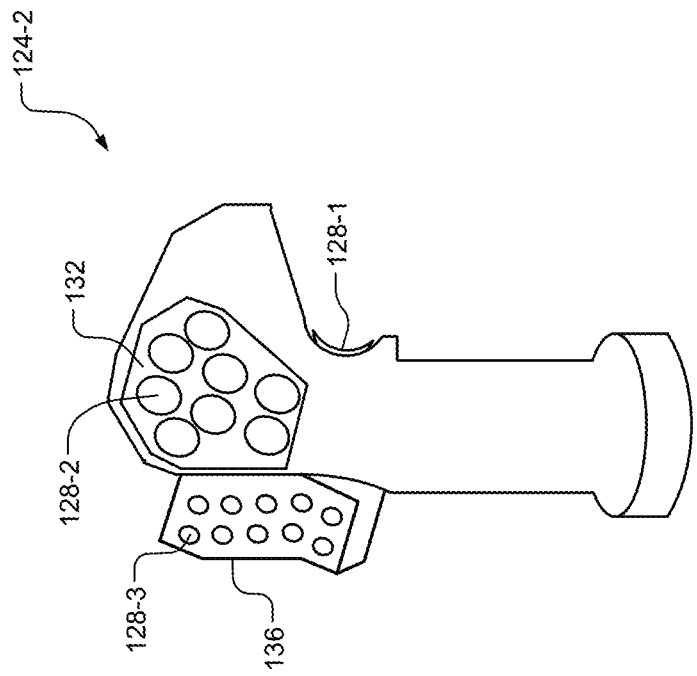
FIGS. 1C and 1D are example control sticks for controlling a forestry machine according to the present disclosure.

Referring now to FIGS. 1A and 1B, an example forestry machine (e.g., a harvester 100) configured to implement a power control system according to the present disclosure is shown. Although shown as a harvester, the principles of the present disclosure may also be applied to other forestry machines, such as a feller buncher, road building machines, etc. The harvester 100 includes a harvester head 104 configured to perform multiple forestry functions. For example, the harvester 100 may include multiple attachments including, but not limited to, front gripping knives or arms configured to grasp trees, a main saw, one or more secondary saws (e.g., a topping saw or blade), delimbing arms and blades, and feed rollers configured to grasp a tree trunk and roll (i.e., rotate) in forward and reverse directions to feed the tree through the harvester head 104.

The harvester head 104 is connected to a main body 108 of the harvester 100 via a boom and arm assembly 112. A cab 116 is mounted on a frame above wheels 120 (as shown in FIG. 1A), tracks 122 (as shown in FIG. 1B), or a combination thereof. An operator controls functions of the harvester 100 from within the cab 116. For example, the operator controls functions of the harvester head 104 and the boom and arm assembly 112 as well as an engine, hydraulic system, braking, etc. from within the cab 116.

Figure 1C:
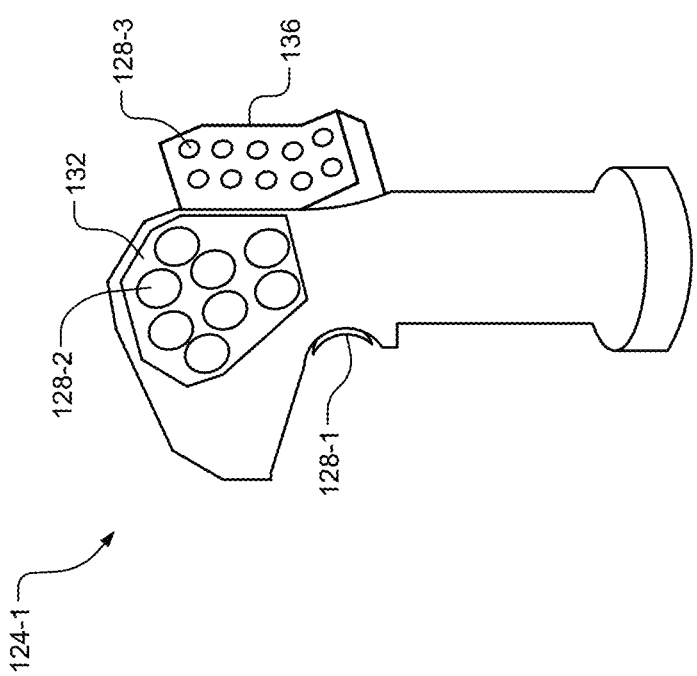

Referring now to FIGS. 1B and 1C and with continued reference to FIG. 1A, the operator controls the harvester head 104 and the boom and arm assembly 112 using controls such as control sticks 124-1 and 124-2, referred to collectively as control sticks 124. For example only, the control sticks 124-1 and 124-2 correspond to left and right control sticks, respectively. Each of the control sticks 124 includes a plurality of actuators (e.g., switches and buttons), such as a rocker switch or trigger 128-1, face buttons 128-2 (on respective faces 132 of the control sticks 124), side console buttons 128-3 (on respective side consoles 136), etc., referred to collectively as actuators 128.

The operator uses each of the actuators 128, individually or collectively with another of the actuators 128, to control respective attachments/functions of the harvester 100. For example, the actuators 128 are configured to control functions including, but not limited to, a main saw, one or more secondary saws (e.g., a topping saw or blade), delimbing arms and blades, feed rollers (including separate actuators for controlling the feed rollers at different speeds and different feed directions), an orientation of the harvester head 104, positioning of the boom and arm assembly 112, gripping knives or arms, etc.

Selected ones of the actuators 128 (i.e., a predetermined subset of all of the actuators 128) are configured to activate a power increase (e.g., an engine speed and associated hydraulic pressure increase) without requiring the operator to activate a separate actuator as described below in more detail. The selected ones of the actuators 128 may correspond to predetermined forestry functions or attachments that may potentially require a power increase to complete associated tasks (i.e., high pressure functions).

For example only, as described herein, the tasks that may trigger the power increase include, but are not limited to, a main saw of the harvester head 104, feed forward and feed reverse functions (e.g., feed rollers) of the harvester head 104, and a topping saw or blade of the harvester head 104. Conversely, actuators that control functions that do not typically require a power increase (e.g., delimbing arms and blades, movement of the harvester head 104 and/or boom and arm assembly 112, movement of the forestry machine 100, swing/rotation of an upper portion of the machine, etc.) are not configured to trigger the power increase. The power increase may be activated in response to a selected one of the actuators 128 being activated and a pressure (e.g., a hydraulic pressure of a pump associated with the task being performed) reaching a predetermined setpoint or threshold.

Figure 2:
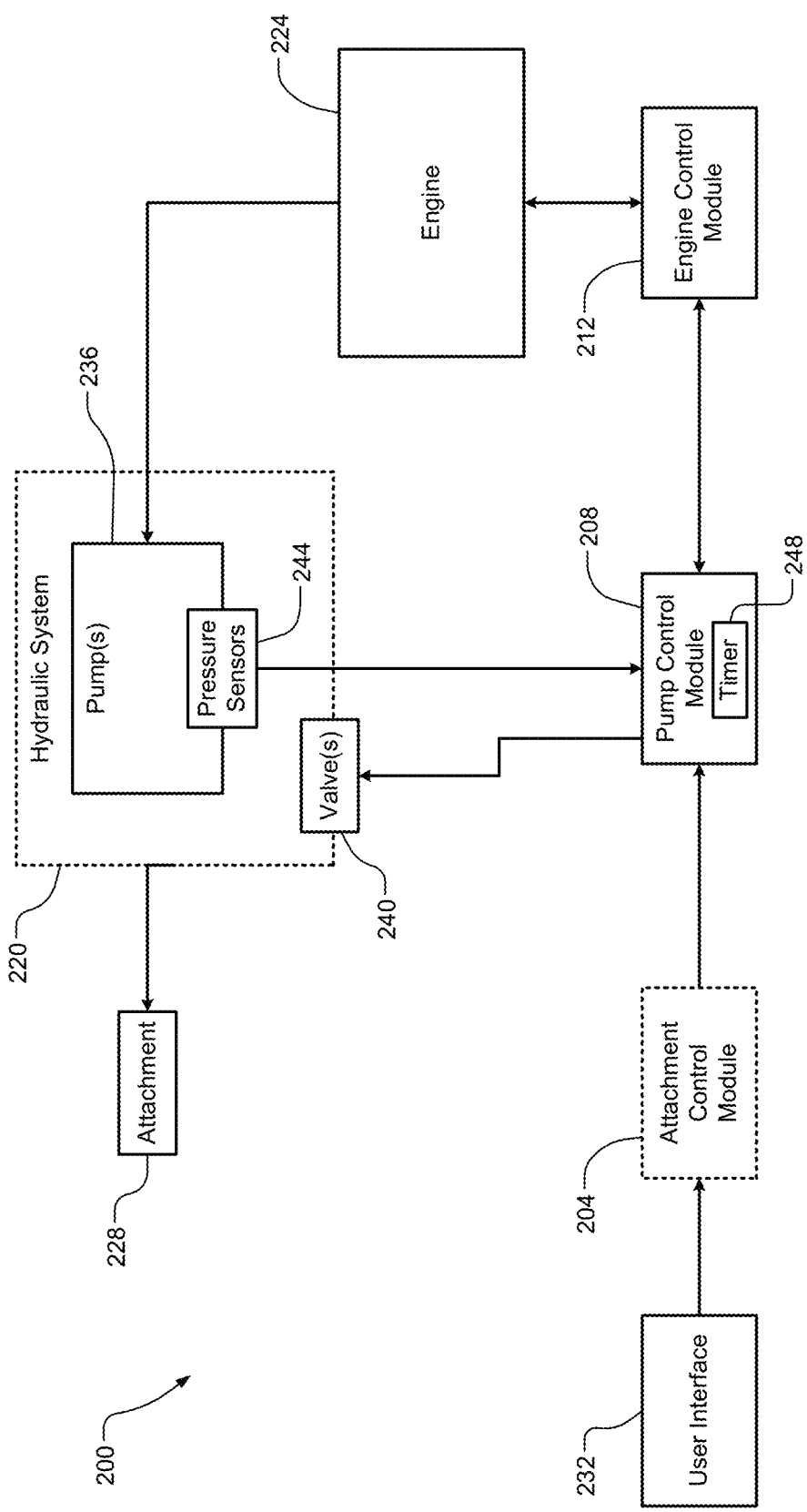
FIG. 2 is a functional block diagram of a power control system according to the present disclosure.

Referring now to FIG. 2 and with continued reference to FIGS. 1A, 1B, and 1C, an example power control system 200 according to the present disclosure is shown. The power control system 200 includes an optional attachment control module 204, a pump control module 208, an engine control module 212, and a hydraulic system 220. The engine control module 212 is configured to selectively increase a maximum engine speed of an engine 224 (e.g., a diesel or non-diesel internal combustion engine) to increase power provided to an attachment 228 of the forestry machine 100 in response to commands received from an operator at a user interface 232 as described below in more detail.

The engine control module 212 is configured to control various functions associated with operation of the engine 224, including combustion and injection timing, power demand and output (e.g., torque and horsepower output), engine speed, etc. Power output is a product of engine speed, which may be limited to a maximum engine speed to optimize fuel efficiency and minimize wear on the engine 224 and other components of the forestry machine 100.

As engine speed increases, a hydraulic flow (and, correspondingly, hydraulic power) that can be provided by the hydraulic system 220 also increases. For example, one or more pumps (e.g., a front pump, a rear pump, etc.) 236 of the hydraulic system 220 operate in accordance with the engine speed. Accordingly, if the engine control module 212 increases (e.g., conditionally and temporarily increases) the maximum engine speed, a maximum power available to the attachment 228 via the hydraulic system 220 also increases. For example, increasing the engine speed allows an increase in pump speed and/or pressure, hydraulic fluid flow rates, etc., and one or more valves (e.g., one or more valves 240 provided between an associated one of the pumps 236 and the attachment 228, referred to hereinafter as "the valve" 240) may be controlled to increase the pressure of the pump 236 and the corresponding pressure provided to the attachment 228.

For example, the operator of the forestry machine 100 controls the attachment 228 using the user interface 232 (e.g., one or more control sticks, such as the control sticks 124). In this example, the attachment 228 corresponds to a function configured to trigger a power increase as described above, such as a main saw of the harvester head 104, feed forward and feed reverse functions (e.g., feed rollers) of the harvester head 104, a topping saw or blade of the harvester head 104, etc. The user interface 232 outputs control signals (e.g., attachment control signals) to the attachment control module 204 in response to inputs from the operator, and the attachment control module 204 controls the attachment 228. In some examples, the attachment control module 204 may be omitted and the user interface 232 outputs the control signals directly to the pump control module 208 and/or the engine control module 212, which in turn control the attachment 228.

The pump control module 208 is further configured to communicate with the engine control module 212 and the hydraulic system 220. For example, the pump control module 208 is configured to selectively implement the power increase according to the present disclosure. In this example, the pump control module 208 receives a signal from the attachment control module 204 indicating that the attachment 228 is being operated. In other words, the attachment control module 208 provides a signal to the pump control module 208 indicating that the operator is activating an actuator (e.g., a button) corresponding to the attachment 228.

In some examples, the attachment control module 204 generates the signal specifically in response to the activated function being a high pressure function. In other examples, the pump control module 208 receives a signal directly from the user interface 232 indicating that a high pressure function was activated. In still other examples, the pump control module 208 receives a signal (directly from the user interface 232, from the attachment control module 204, etc.) when any function is activated and is configured to determine whether the activated function is a high pressure function. In any example, the signal received by the pump control module 208 is used to determine whether the function being activated is a high pressure function (i.e., one of a subset of all possible functions performed by the forestry machine 100) that may trigger a power increase as described below in more detail.

The pump control module 208 also receives signals from one or more pressure sensors 244. For example, the pump control module 208 receives a signal from one of the pressure sensors 244 indicating a pressure (i.e., a sensed or measured pressure) of the pump 236 that provides flow to the attachment 228. The pump control module 208 compares the sensed pressure of the pump 236 to a pressure setpoint or threshold (e.g., a high pressure setpoint). For example, the high pressure setpoint is determined in accordance with the operation of selected functions that may require a power increase. In other words, the selected functions that may require a power increase as described above may cause the pressure of the pump 236 to increase significantly. If the sensed pressure reaches the high pressure setpoint (e.g., due to a magnitude of a load being processed by the activated function) during the operation, the power increase may be required to complete the corresponding task.

Accordingly, the pump control module 208 compares the sensed pressure to the high pressure setpoint to determine whether to trigger the power increase. If the pump control module 208 determines that sensed pressure has reached (i.e., is greater than or equal to) the high pressure setpoint and receives the signal indicating that a high pressure function of the attachment 228 is being operated, the pump control module 208 triggers the power increase.

For example, to trigger the power increase, the pump control module 208 outputs a signal to the engine control module 212 indicating a request for the power increase and the engine control module 212 increases the maximum engine speed accordingly. In other words, during the power increase, the engine control module 212 allows the engine 224 to reach a higher maximum engine speed and power output (e.g., a maximum engine speed increase of 100-500 rpm and a power output increase of 10-50 horsepower). The pump control module 208 further increases a maximum pump pressure of one or more of the pumps 236 (e.g., by 100-500 psi).

During the power increase, the valve 240 may be controlled to increase the pressure provided to the attachment 228. For example, the pump control module 208 (or, in some examples, the attachment control module 204) is configured to shift or adjust the valve 240, to increase a maximum pressure that can be provided by the pump 236 in response the attachment 228 being activated and the sensed pressure reaching the high pressure setpoint. In other words, the pump control module 208 controls the valve 240 to achieve the increased pressure required by functions designated as high pressure functions. For example only, the valve 240 corresponds to a pressure relief valve.

The pump control module 208 may end the power increase when one or more conditions are met. For example, the pump control module 208 may end the power increase (e.g., cause the engine control module 224 to decrease the maximum engine speed) in response to the operator releasing the actuator or button used to activate the attachment 228 and/or the sensed pressure decreasing below the high pressure setpoint.

Figure 3:
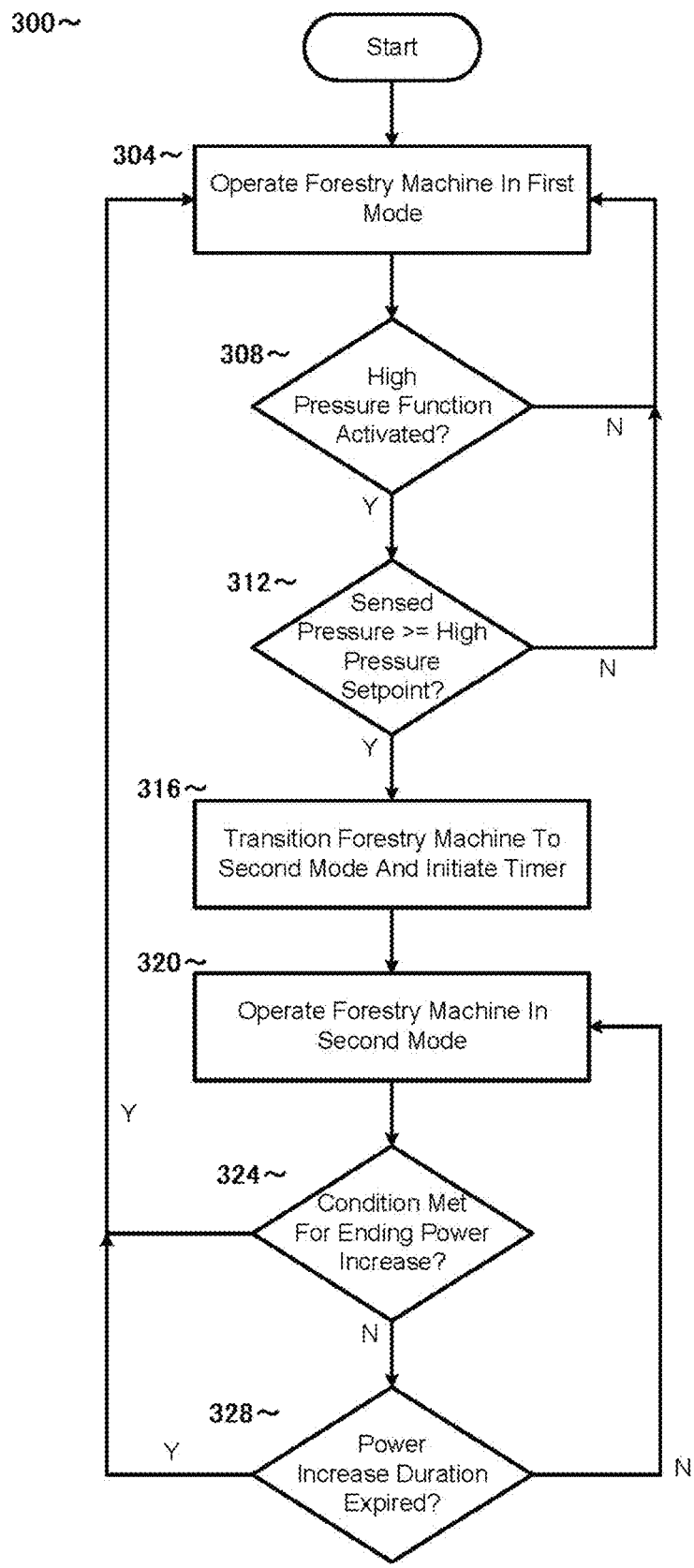
FIG. 3 illustrates steps of an example power control method according to the present disclosure.

Further, a duration of the power increase may be limited regardless of whether the one or more conditions for ending the power increase are met. For example, the duration of the power increase may be limited to 2-15 seconds to minimize fuel consumption and component wear. In one example, the pump control module 208 initiates a timer 248 when the power increase is triggered. The timer 248 may be separate from or integral with (as shown) the pump control module 208. When the timer reaches a predetermined time limit, the pump control module 208 ends the power increase. For example, the pump control module 208 outputs signals causing the engine control module 224 to decrease the maximum engine speed Referring now to FIG. 3, an example power control method 300 according to the present disclosure is shown. For example, the power control method 300 is implemented by the power control system 200 described above in FIG. 2. At 304, a forestry machine (e.g., the forestry machine 100) is operated in a first mode. For example, in the first mode, engine speed is limited in accordance with a maximum engine speed and pump pressure is limited.

At 308, the method 300 (e.g., the attachment control module 204) determines whether an operator of the forestry machine 100 has activated an actuator corresponding to a high pressure function of the attachment. If true, the method 300 continues to 312. If false, the method 300 continues to 304. At 312, the method 300 (e.g., the pump control module 208) determines whether a sensed pressure of a pump associated with the high pressure function or attachment has reached a high pressure setpoint. If true, the method 300 continues to 316. If false, the method 300 continues to 304.

At 316, the method 300 (e.g., the pump control module 208) transitions the forestry machine 100 to a second mode and initiates a timer (e.g., the timer 248). In the second mode, the maximum engine speed is increased and at least one valve is adjusted to allow a higher pump pressure to increase the power available to the attachment and the forestry machine 100. At 320, the forestry machine 100 is operated in the second mode.

At 324, the method 300 (e.g., the attachment control module 204 and/or the pump control module 208 determines whether one or more conditions are met for ending the power increase and transitioning the forestry machine 100 to the first mode. For example, the method 300 determines whether the operator released the actuator or button used to activate the attachment 228 and/or the sensed pressure decreased below the high pressure setpoint. If true, the method 300 transitions the forestry machine 100 to the first mode and continues to 304. If false, the method 300 continues to 328.

At 328, the method 300 (e.g., the pump control module 208) determines whether the timer 248 has reached a predetermined duration (i.e., whether a power increase duration has expired). If true, the method 300 transitions the forestry machine 100 to the first mode and continues to 304. If false, the method 300 continues to 320.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), a controller area network (CAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system for a forestry machine configured to perform a plurality of functions, the power control system comprising:
    an engine control module configured to control an engine speed of an engine of the forestry machine, wherein the engine speed is limited in accordance with a maximum engine speed; and
    a pump control module configured to:
        determine whether a first function of a predetermined subset of the plurality of functions of the forestry machine is activated, wherein the predetermined subset of the plurality of functions are functions of one or more selected attachments of the forestry machine;
        determine whether the activated first function is designated as a high pressure function;
        determine that a magnitude of a pressure of a pump that provides flow to the activated first function has increased, wherein the increase of magnitude of the pressure is caused by the activation of the first function;
        determine that the magnitude of the pressure is greater than or equal to a high pressure setpoint; and
        upon determining that the first function is activated, the activated first function is a high pressure function, the magnitude of the pressure of the pump that provides flow to the activated first function has increased, and the increase in the pressure is greater than or equal to the high pressure setpoint, output a control signal indicating a request for a power increase,
    wherein the engine control module receives the request for the power increase and is configured to increase the maximum engine speed of the engine in response to the request for the power increase received from the pump control module.

2. The power control system of claim 1, wherein determining whether the first function is activated includes receiving a signal indicating that a first attachment configured to perform the first function is activated.

3. The power control system of claim 1, wherein the pump control module is configured to initiate a timer upon detecting the power increase and end the power increase when the timer reaches a predetermined duration.

4. The power control system of claim 1, wherein the pump control module is configured to end the power increase in response to a determination that at least one of (i) the first function is no longer activated and (ii) the increase in the pressure is less than the high pressure setpoint.

5. The power control system of claim 1, further comprising a valve that is selectively shifted or adjusted to increase pressure output by the pump in response to the first function being activated and the increase in the pressure being greater than or equal to the high pressure setpoint.

6. The power control system of claim 5, further comprising an attachment control module.

7. The power control system of claim 6, wherein the attachment control module is configured to receive attachment control signals from a user interface.

8. The power control system of claim 7, wherein the user interface includes at least one control stick of the forestry machine.

9. The power control system of claim 8, wherein determining whether the first function is activated includes determining whether an actuator on the at least one control stick that is used to control the first function is activated.

10. A forestry machine comprising the power control system of claim 1.

11. The forestry machine of claim 9, wherein the forestry machine is one of a harvester, a forestry excavator, and a feller buncher.

12. A method of operating a power control system for a forestry machine configured to perform a plurality of functions, method comprising:
controlling an engine speed of an engine of the forestry machine, wherein the engine speed is limited in accordance with a maximum engine speed;
determining whether a first function of a predetermined subset among the plurality of functions of the forestry machine is activated, wherein the predetermined subset of the plurality of functions are functions of one or more selected attachments of the forestry machine;
determining whether the activated first function is designated as a high pressure function;
determining that a magnitude of a pressure of a pump that provides flow to the activated first function has increased, wherein the increase of magnitude of the pressure is caused by the activation of the first function;
determining that the magnitude of the pressure is greater than or equal to a high pressure setpoint;
upon determining that the first function is activated, the activated first function is a high pressure function, the magnitude of the pressure of the pump that provides flow to the activated first function has increased, and the increase in the pressure is greater than or equal to the high pressure setpoint, output a control signal indicating a request for a power increase; and
increasing the maximum engine speed of the engine in response to the request for the power increase.

13. The method of claim 12, wherein determining whether the activated first function includes receiving a signal indicating that a first attachment configured to perform the activated first function.

14. The method of claim 12, further comprising initiating a timer when the power increase is detected and ending the power increase when the timer reaches a predetermined duration.

15. The method of claim 12, further comprising ending the power increase in response to a determination that at least one of (i) the first function is no longer activated and (ii) the increase in the pressure is less than the high pressure setpoint.

16. The method of claim 12, further comprising selectively shifting a valve to increase pressure output by the pump in response to the first function being activated and the increase in the pressure being greater than or equal to the high pressure setpoint.

17. The method of claim 12, further comprising receiving attachment control signals from a user interface, wherein the user interface includes at least one control stick of the forestry machine.

18. The method of claim 17, wherein determining whether the activated first function includes determining whether an actuator on the at least one control stick that is used to control the activated first function.

* * * * *